US012294472B2

(12) United States Patent
Ramirez et al.

(10) Patent No.: US 12,294,472 B2
(45) Date of Patent: May 6, 2025

(54) SOFTWARE-BASED CROSS DOMAIN SOLUTIONS

(71) Applicant: International Business Machines Corporation, Armonk, NY (US)

(72) Inventors: Armando Ramirez, Tampa, FL (US); Renganathan Sundararaman, Cary, NC (US); Sharath Srinivasa Setty, Cupertino, CA (US); Jeffery L. Hampton, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 18/201,028

(22) Filed: May 23, 2023

(65) Prior Publication Data
US 2024/0396765 A1    Nov. 28, 2024

(51) Int. Cl.
*H04L 12/66*    (2006.01)
*H04L 69/08*    (2022.01)

(52) U.S. Cl.
CPC .............. *H04L 12/66* (2013.01); *H04L 69/08* (2013.01)

(58) Field of Classification Search
CPC ............. H04L 49/3009; H04L 63/0263; H04L 67/141; H04L 69/165; H04L 9/0827; H04L 47/2441; H04L 49/90; H04L 63/10; H04L 63/1425; H04W 12/009; G06F 11/263; G06F 21/6281
See application file for complete search history.

(56) References Cited

U.S. PATENT DOCUMENTS

| | | | |
|---|---|---|---|
| 9,880,869 B2 | 1/2018 | Mraz et al. | |
| 11,137,885 B2 | 10/2021 | Beechuk et al. | |
| 11,349,872 B2 | 5/2022 | Smith, II et al. | |
| 11,595,410 B2* | 2/2023 | Atighetchi | H04W 12/009 |
| 2007/0168301 A1* | 7/2007 | Eisner | H04L 49/3009 |
| | | | 705/79 |
| 2017/0060715 A1* | 3/2017 | Ye | G06F 11/263 |
| 2017/0171220 A1* | 6/2017 | Thomson | H04L 49/90 |
| 2018/0115528 A1* | 4/2018 | Rotvold | H04L 9/0827 |
| 2018/0351914 A1* | 12/2018 | Jobson | H04L 63/0263 |

(Continued)

OTHER PUBLICATIONS

Dimou et al., "Demonstration of a Cross Security Domain Service Management Capability for Federated Missions," IEEE Military Communications Conference, 2014, pp. 184-191.

(Continued)

*Primary Examiner* — Dustin Nguyen
(74) *Attorney, Agent, or Firm* — Zilka-Kotab, P.C.

(57) ABSTRACT

A computer-implemented method, in accordance with one aspect of the present invention, includes receiving, by a sender multi-protocol gateway (MPG) implemented in software, data from a sender application for transmission to a receiver endpoint. The data is validated against a predefined schema definition by the sender MPG. In response to successfully validating the data, a service request is made, by the sender MPG, using preconfigured information. An endpoint of the service request is a receiver MPG configured to forward the validated data to a receiver application in communication with the receiver endpoint. The receiver MPG is configured to not reply in any way to the sender MPG and sender application in response to receiving the service request.

18 Claims, 6 Drawing Sheets

(56) References Cited

U.S. PATENT DOCUMENTS

| | | | |
|---|---|---|---|
| 2020/0120071 A1* | 4/2020 | Wimmer | H04L 69/165 |
| 2020/0412722 A1* | 12/2020 | Al Amer | H04L 63/10 |
| 2021/0192083 A1* | 6/2021 | Falk | G06F 21/6281 |
| 2021/0281581 A1 | 9/2021 | Atighetchi et al. | |
| 2022/0329671 A1* | 10/2022 | Shilawat | H04L 63/0263 |
| 2022/0417268 A1* | 12/2022 | Otto | H04L 63/1425 |
| 2023/0164224 A1* | 5/2023 | Adogla | H04L 67/141 |
| | | | 709/227 |
| 2024/0333638 A1* | 10/2024 | Gupta | H04L 47/2441 |

OTHER PUBLICATIONS

Anonymous, "Method and System for Cross-domain Gathering of Relevant Information," IP.com Prior Art Database, Technical Disclosure No. IPCOM000240506D, Feb. 4, 2015, 5 pages.

* cited by examiner

SOFTWARE-BASED CROSS DOMAIN SOLUTIONS

BACKGROUND

The present invention relates to cross domain communications, and more specifically, this invention relates to utilizing multi-protocol gateways to communicate unidirectionally from a less secure system to a relatively more secure system, or vice versa.

Cross Domain Solution (CDS) is required by government regulations governing the movement of data between networks of different security classifications. Generally, CDS is used when data is being transmitted from a lower classification/low side (e.g., secret) to a higher level of classification/high side (e.g., Top Secret).

CDS is currently implemented using a hardware-based "guard" whose function is to validate the data being sent to the high side, as well as prevent "leakage" of data from the high side to the low side. In the case of validation, the main purpose is to ensure the information being transmitted does not contain a payload intended to disrupt processing or forms of trojan horse exploits. In the case of preventing leakage, the guard is designed to not provide responses of any kind. The lack of any acknowledgment is an attempt by design to defeat probing/listening attempts to begin a dialog to gain insights to penetrate the network defenses.

Currently all guards have a hardware component, based around an isolation diode, used to electrically prevent leakage of data. The isolation diode allows incoming signals but prevents transmission of outbound signals. This configuration requires special equipment to be taken into the field in cases where units, e.g., soldiers, diplomats, etc. at the edge of the network (low side) need access to connect to secure networks (high side). However, the extra hardware is cumbersome, and adds to the load a unit need to carry. Additionally, the extra hardware is an additional point of failure for ancillary equipment supporting the equipment deployed in the field with the unit.

SUMMARY

A computer-implemented method, in accordance with one aspect of the present invention, includes receiving, by a sender multi-protocol gateway (MPG) implemented in software, data from a sender application for transmission to a receiver endpoint. The data is validated against a predefined schema definition by the sender MPG. In response to successfully validating the data, a service request is made, by the sender MPG, using preconfigured information. An endpoint of the service request is a receiver MPG configured to forward the validated data to a receiver application in communication with the receiver endpoint. The receiver MPG is configured to not reply in any way to the sender MPG and sender application in response to receiving the service request.

A computer program product, according to another aspect of the present invention, includes one or more computer readable storage media, and program instructions collectively stored on the one or more computer readable storage media. The program instructions include program instructions to perform the foregoing method.

A system, according to another aspect of the present invention, includes a processor, and logic integrated with the processor, executable by the processor, or integrated with and executable by the processor. The logic is configured to perform the foregoing method.

Other aspects of the present invention will become apparent from the following detailed description, which, when taken in conjunction with the drawings, illustrate by way of example the principles of the invention.

DETAILED DESCRIPTION

Figure 1:
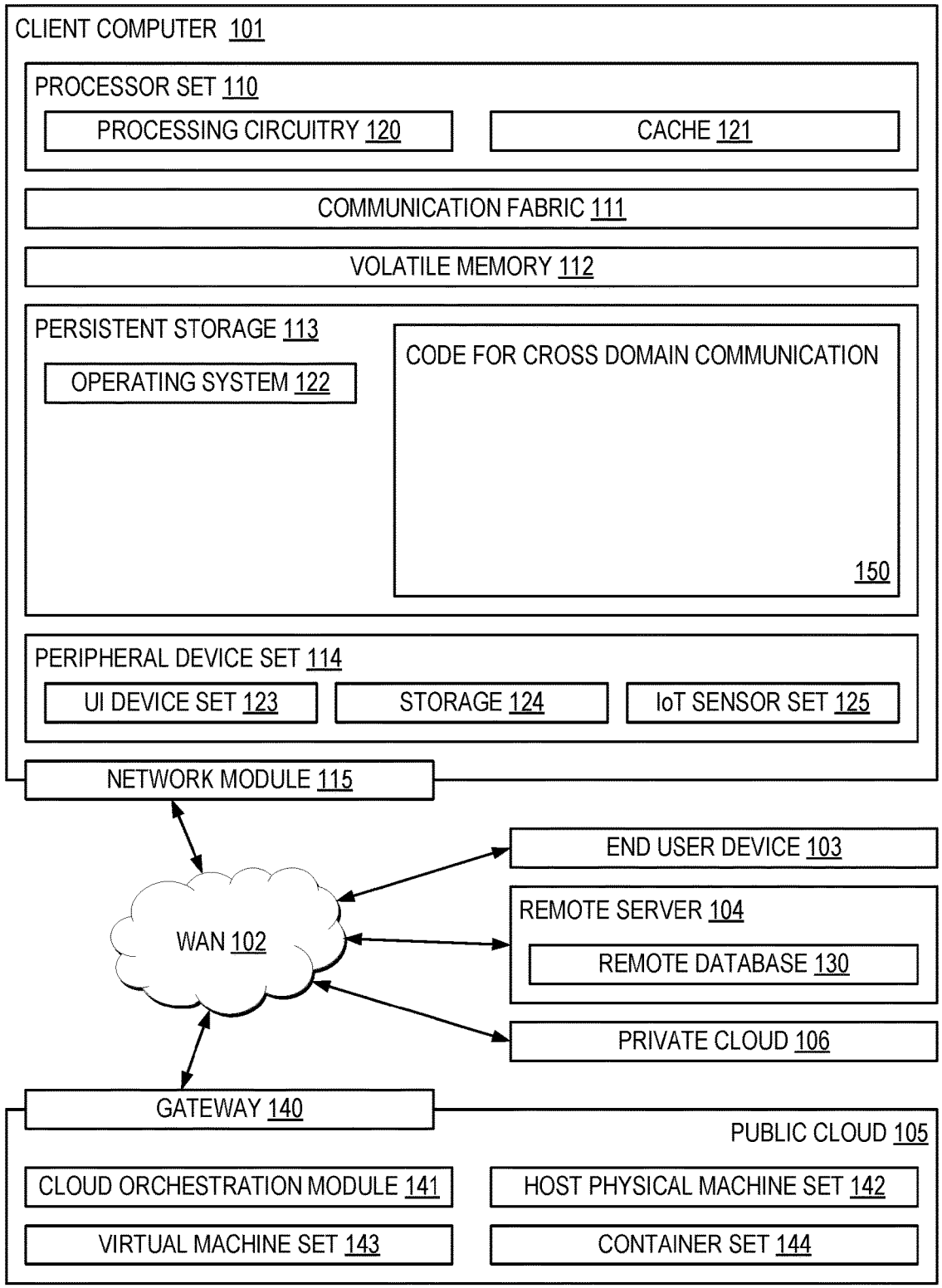
FIG. 1 is a diagram of a computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for software-based cross domain communications.

In one general approach, a computer-implemented method includes receiving, by a sender multi-protocol gateway (MPG) implemented in software, data from a sender application for transmission to a receiver endpoint. The data is validated against a predefined schema definition by the sender MPG. In response to successfully validating the data, a service request is made, by the sender MPG, using preconfigured information. An endpoint of the service request is a receiver MPG configured to forward the validated data to a receiver application in communication with the receiver endpoint. The receiver MPG is configured to not reply in any way to the sender MPG and sender application in response to receiving the service request.

Because the sender MPG is implemented in software, the methodology presented herein provide a CDS which does not have the extra hardware requirement of traditional CDS. While this solution does not provide the electrical isolation of a physical diode, sufficient isolation can be achieved to offset the risk of leakage with the reward of a simplified solution and no need for additional specialized hardware in the field, e.g., for deployed units.

Moreover, because the receiver MPG is configured to not reply in any way, the receiver MPG would seem like a black hole, in that any probing or attempts to interact would result in zero responses. Also, given there is risk to having a low side MPG in the field, even in the event the low side MPG was to be captured and/or compromised, no data is ever returned from the high side MPG, so the compromised low side MPG cannot be used as a gateway to the high side.

In one approach, a computer running the sender MPG does not have an isolation diode. Accordingly, no specialized equipment is needed, nor is there a need to power an additional piece of equipment. This also results in fewer points of failure relative to current hardware-based systems that use an isolation diode.

In one approach, the receiver MPG is implemented in software. Accordingly, no specialized equipment is needed, as the software can run on a computer such as a laptop, tablet, phone, etc. Nor is there a need to power an additional piece of equipment such as an MPG hardware module. Moreover, the sender MPG can be installed over a network as opposed to having to physically ship hardware.

In one approach, the methodology includes, in response to receiving, by the sender MPG, a request from the sender application to connect to the sender MPG, authenticating, by the sender MPG, the sender application; and in response to authenticating the sender application, authorizing, by the sender MPG, the sender application to connect to the sender MPG. The data is received, by the sender MPG, in response to connecting to the sender application. This feature ensures, for example, that the sender application is authorized to communicate in the overall system.

In one approach, the sender application deconstructs the data to a textual format prior to sending the data to the sender MPG. This transformation of the data prevents the submission of malware with the data, increasing security of the overall process and removing a potential avenue for attack.

In one approach, the methodology includes sending, by the sender MPG, a key generator code to the sender application in response to receiving the data from the sender application. A key generated using the key generator code is received by the sender MPG from the sender application. The key is verified by the sender MPG. In response to successful verification of the key, the aforementioned validating of the data is performed. Verifying the key ensures that the sender application is not nefarious.

In one approach, the schema definition defines fields in the data that are to be sent to the receiver MPG. Validating the data against the predefined schema definition includes validating each field in the data against constraints provided in the schema definition. The constraints are used to check the data in those fields. This validation may be used to ensure, for example, that only data that has all the proper fields is valid for submission to the receiver endpoint is sent to the receiver MPG. If validation fails, the data is not sent to the receiver MPG.

In one approach, the receiver MPG is configured to validate the received data against a copy of the predefined schema definition that is available to the receiver MPG. This ensures that the data received is valid and received from an authorized sender application and/or authorized sender MPG. The copy of the predefined schema definition is preferably identical to the schema definition used by the sender MPG, but could have variations that allow the receiver MPG to receive data from multiple sender MPGs.

In one approach, the sender MPG is deleted for disabling sending of additional data to the receiver MPG. This unique feature is enabled by the software nature of the sender MPG, allowing quick and complete destruction of the sender MPG without having to destroy hardware, thereby ensuring that the sender MPG does not fall into the hands of an unauthorized entity who might try to reverse engineer the sender MPG for nefarious purposes. In contrast, it is difficult to completely destroy hardware in the field, rendering it vulnerable to capture.

In one approach, the sender MPG is deployed on a mobile computer such as a laptop computer, tablet computer, mobile telephone, etc. Because the solution disclosed herein operates without the need for specialized hardware such as an isolation diode, it is much more portable than current hardware based CDSs.

In one approach, the sender MPG is deployed on a cloud-based server in communication with a remote computer running the sender application. This provides an additional layer of security, in that the sender MPG is located far from the sender application, and thus less likely to be compromised in the event the computer running the sender application is captured.

In one approach, the receiver MPG receives the service request. The data associated with the service request is validated by the receiver MPG against a copy of the predefined schema definition, which preferably is the same as used by the sender MPG. In response to successfully validating the data, the data is sent to the receiver application, which may reconstruct the data to the original format and forward the data to the receiver endpoint for use and/or further processing. The receiver MPG is preferably implemented in software, and does not have an isolation diode. These features provide similar benefits and technical effects as set forth above for the sender MPG, but on the receiving side.

In further approaches, the methodology includes combinations of the foregoing approaches.

A computer program product, according to another aspect of the present invention, includes one or more computer readable storage media, and program instructions collectively stored on the one or more computer readable storage media. The program instructions include program instructions to perform any combination the foregoing methodology.

A system, according to another aspect of the present invention, includes a processor, and logic integrated with the processor, executable by the processor, or integrated with and executable by the processor. The logic is configured to perform any combination of the foregoing methodology.

Various aspects of the present disclosure are described by narrative text, flowcharts, block diagrams of computer systems and/or block diagrams of the machine logic included in computer program product (CPP) aspects. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product aspect ("CPP aspect" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as cross domain communication code of block 150. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various aspects of the present invention.

Figure 2:
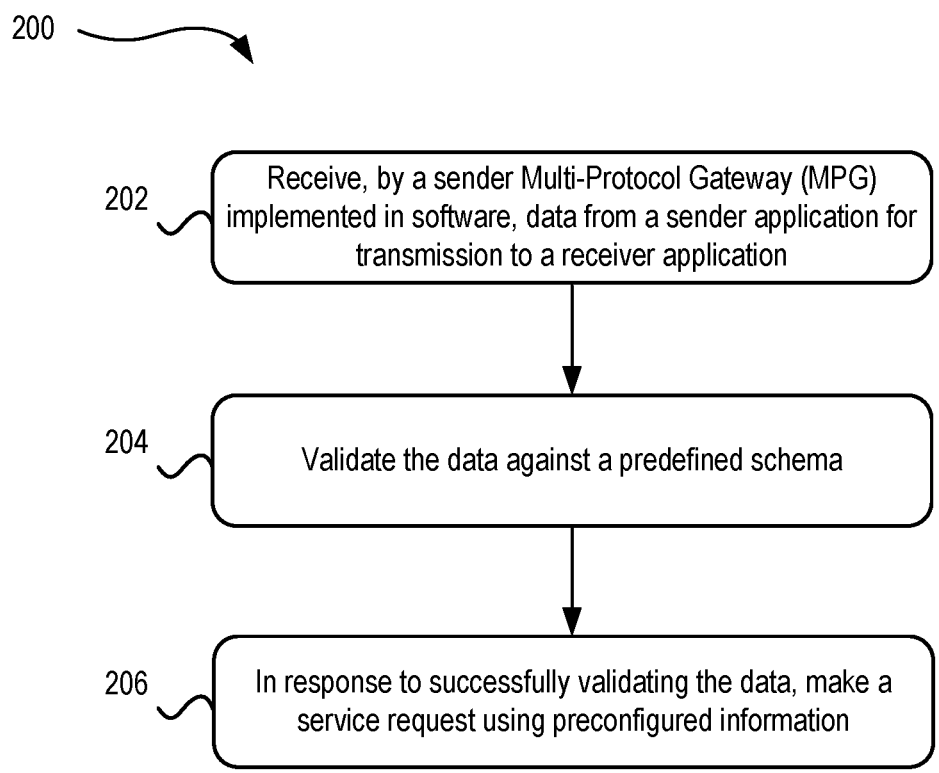
FIG. 2 is a flowchart of a method, in accordance with one aspect of the present invention.

Now referring to FIG. 2, a flowchart of a method 200 is shown according to one aspect of the present invention. The method 200 may be performed in accordance with the present invention in any of the environments depicted in FIG. 1, among others, in various approaches. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various approaches, the method 200 may be partially or entirely performed by a computer, a network card, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, which includes receiving, by a sender multi-protocol gateway (MPG) implemented in software, data from a sender application for transmission to a receiver endpoint. In operation 204, the data is validated against a predefined schema definition by the sender MPG. In operation 206, in response to successfully validating the data, a service request is made, by the sender MPG, using preconfigured information. An endpoint of the service request is a receiver MPG configured to forward the validated data to a receiver application in communication with the receiver endpoint. The receiver MPG is configured to not reply in any way to the sender MPG and sender application in response to receiving the service request.

More details about aspects of the operations of FIG. 2 are provided below with reference to FIGS. 3 and 4.

Figure 3:
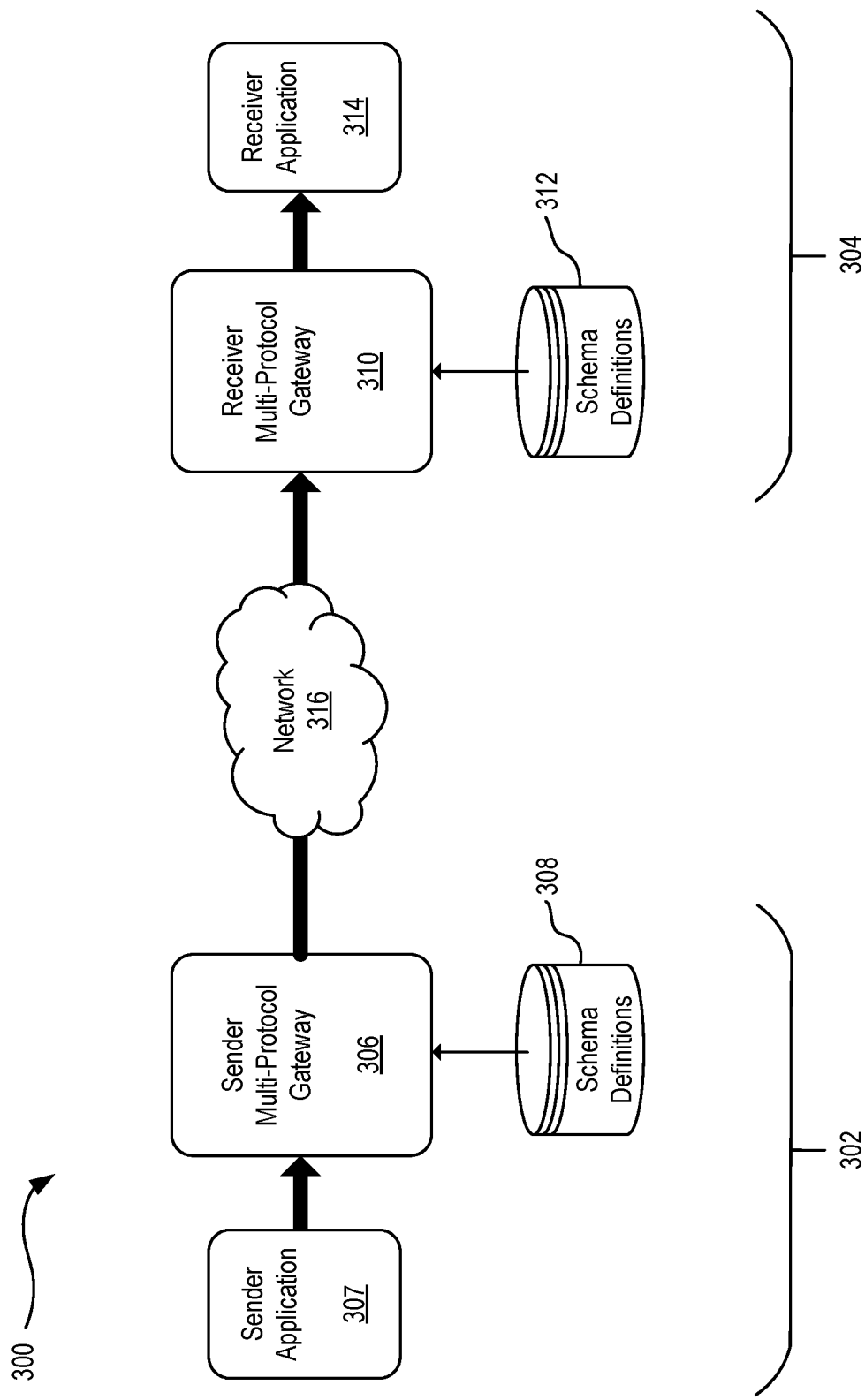
FIG. 3 is a conceptual diagram of a CDS system for unidirectional data flow, in accordance with one aspect of the present invention.

FIG. 3 is a conceptual diagram of a CDS system 300 for unidirectional data flow between "sides" having different security levels, in accordance with one aspect of the present invention. As an option, the present system 300 may be implemented in conjunction with features from any other approach listed herein, such as those described with reference to the other FIGS. Of course, however, such system 300 and others presented herein may be used in various applications and/or in permutations which may or may not be specifically described in the illustrative aspects listed herein. Further, the system 300 presented herein may be used in any desired environment.

In the system, preferably only known formats of data that can be validated are allowed to pass through the system 300.

The low side 302 may be a relatively less secure environment than the high side 304, e.g., as specified by a security protocol.

As shown, the low side 302 includes a sender MPG 306 implemented in software on a computer of any type disclosed herein. The sender MPG 306 is configured with the information needed to communicate with the receiver MPG 310. Such information may include any information that enables the communication disclosed herein. Examples include a certificate, IP address of the receiver MPG 310, port, service name within a Multi-Protocol Gateway Virtual Machine, etc. In this way, the sender MPG 306 knows how and where to send the service request, even though receipt thereof is never acknowledged by the receiver MPG 310.

Note that the information may be preconfigured into the sender MPG 306. In other approaches, the information may be received by the MPG, e.g., at some point prior to sending the service request, even moments before.

A sender application 307 is in communication with the sender MPG 306. The sender application 307 may receive data, e.g., a data payload, from any application by which a user or computer sends communications, e.g., an email program, a messaging program, etc. Thus, for example, the data payload may be data in any format, e.g., binary, image file, text, etc.

In one approach, the sender application 307 deconstructs the data from the format in which it was received to a predefined format prior to sending the data to the sender MPG 306. Protocol adaptors and/or data converters of a type known in the art can be adapted for use in the sender application 307. For example, the predefined format may be a textual format such as XML, etc. Thus, an image file may be converted to XML to ensure that any manipulation of the image file to embed nefarious code is exposed. Thu, this transformation of the data prevents the submission of malware with the data, increasing security of the overall process and removing a potential avenue for attack.

Note that the sender MPG 306 may be configured to accept data payloads in more than one predefined format, e.g., especially when the sender MPG 306 operates with many sender applications 307. However, all of those predefined formats are preferably known formats in which the data can be checked to ensure nothing nefarious is embedded in the data.

The sender MPG 306 has access to a database 308 of schema definitions that are used to validate data from the sender application 307 that is to be sent to a receiver MPG 310. A schema definition is generally defined as a definition of the fields that will be passed in a communication from the low side to the high side, and of the constraints that are used to check the data in those fields. By specifying not only the proper fields but also the constraints for the data in those fields, even if a nefarious actor learned the format of the data fields, said actor would also need to know the valid values for those fields.

Preferably, the schema definitions are predefined, e.g., by an administrator of the system 300, etc. The database 308 may be stored on the same computer as the sender MPG 306, may be located remotely from said computer and preferably accessed via secure connection, etc.

In one example, a schema definition may define a "name" field and specify alphabetic text in the name field. If data from a sender application is received by the sender MPG that includes a numeric value in the name field instead of text, the data fails to match the schema definition and is not validated, and thus is not sent from the sender MPG. In another example, if the schema definition defines fields A, B and C in order, and the data is received with fields arranged as A, C and B, the data may likewise be rejected. Thus, the sender MPG can be said to expect data to conform to a particular pattern by discerning data that matches a particular predefined schema, and rejecting data that does not conform thereto.

Similarly, the high side 304 includes a receiver MPG 310. The receiver MPG 310 is preferably also implemented in software on a computer of any type disclosed herein. In other approaches, the receiver MPG may be implemented in hardware, e.g., with an isolation diode, etc.

The receiver MPG 310 has access to a database 312 of schema definitions that are used to validate data that is received from the sender MPG 306. The database 312 preferably includes the schema definitions of database 308. In this way, both MPGs apply the same schema definitions to the data.

In one approach, the receiver MPG 310 is configured to select a predefined schema upon receiving a service request from the sender MPG 306. In this way, the receiver MPG 310 can discern whether the data matches the expected pattern as defined by the schema definition. If the data does not match the schema definition, the data is rejected, e.g., because it may be from a nefarious source.

The receiver MPG 310 is in communication with a receiver application 314 that reconstructs the data validated by the receiver MPG 310 to its original format, and forwards the reconstructed data to the receiver endpoint. The receiver application 314 may provide essentially the reverse functionality of the sender application 307.

In a typical deployment, the sender MPG 306 is located in the field and the receiver MPG 310 is located at a stationary location, such as a secure site. However, in some approaches, the receiver MPG 310 may be located in the field, e.g., on a portable computer traveling with a user. In such case, the receiver MPG 310 that is in the field is ideally one that is implemented in software, i.e., requires no isolation hardware.

In further approaches, the sender MPG 306 and/or receiver MPG 310 is located in the cloud. For example, the sender MPG may be deployed on a cloud-based server in communication with a remote computer running the sender application. A benefit of an MPG implemented in software as described herein is that it can be deployed to third party clouds without the need for specialized infrastructure. Communications between the end user device(s) and the MPG(s) in the cloud may be conducted using communications encrypted via known techniques.

The network 316 of the system 300 may be any type of network or combination of networks known in the art, e.g., the Internet, a telephony network, etc.

An example of the operation of various components of the system 300 of FIG. 3 is presented below with reference to FIG. 4.

The system 300 of FIG. 3 illustrates how to move data from the low side 302 to the high side 304. In other aspects, the roles may be reversed, with the high side sending data to the low side. In such case, the receiver MPG at the low side does not provide any response. If data is to be sent in both directions, the deployment may have four MPGs, one pair configured as shown in FIG. 3, and another pair configured in the reverse direction.

Figure 4:
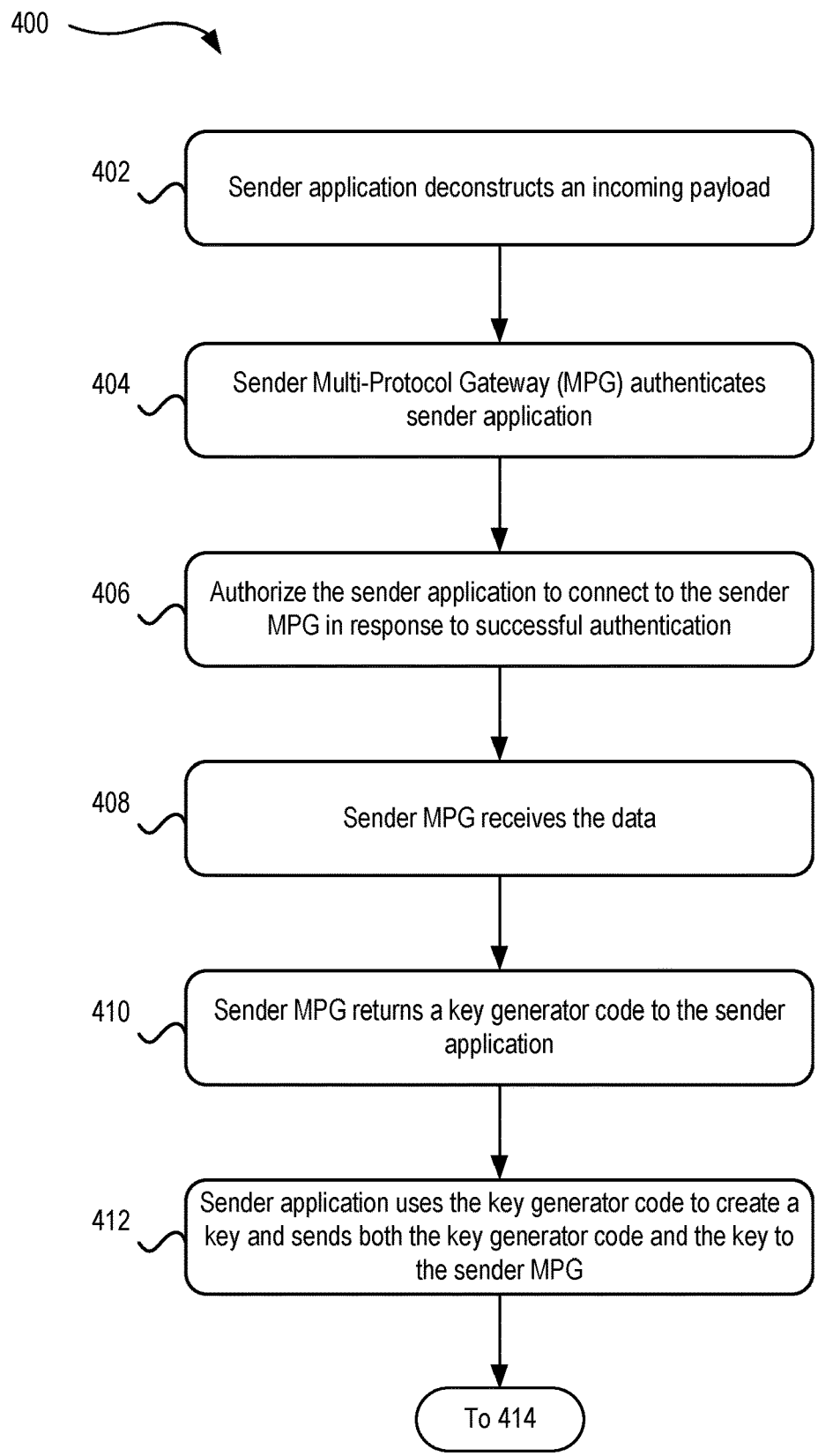
FIG. 4 is a flowchart of a method, in accordance with one aspect of the present invention.
Figure 4:
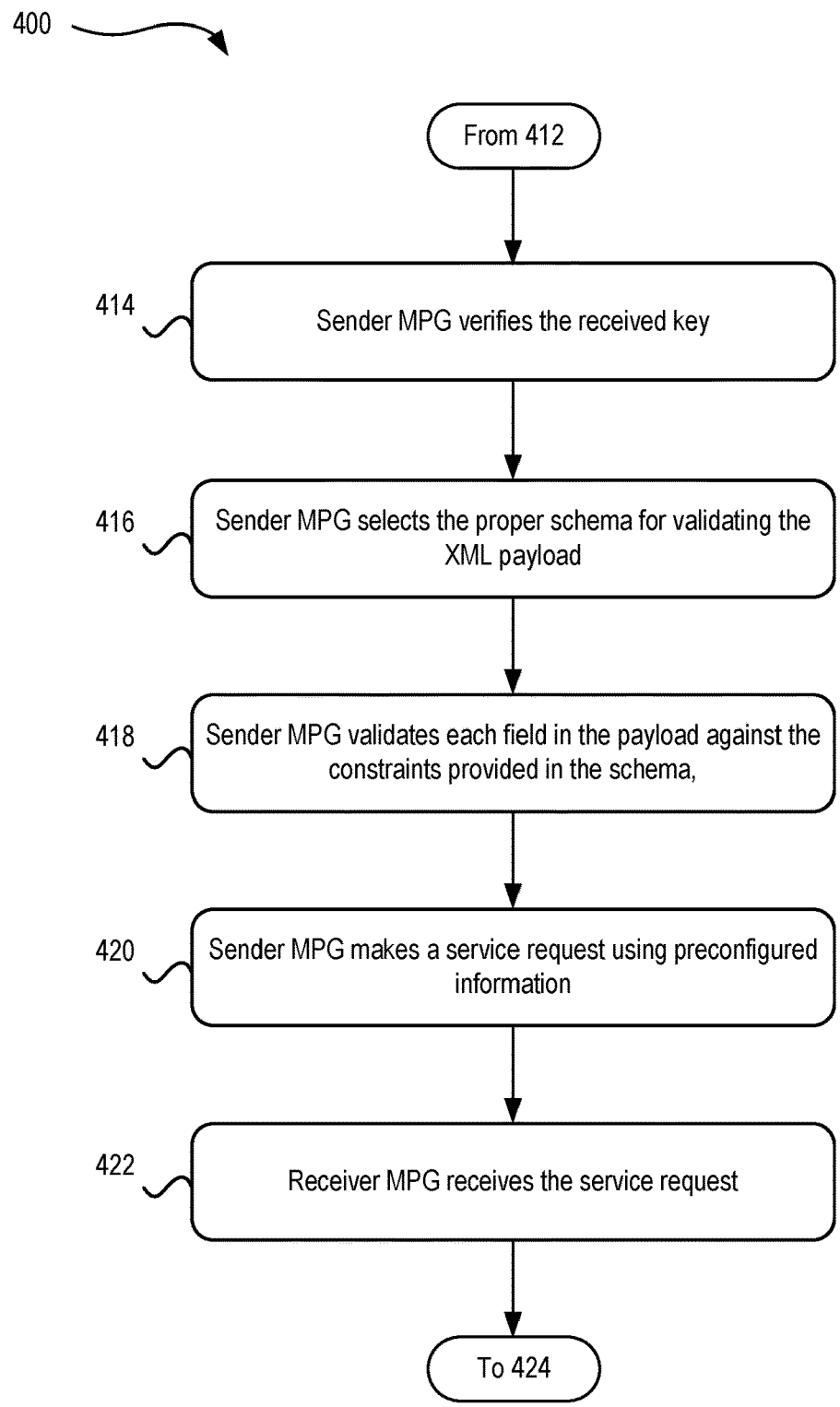
Figure 4:
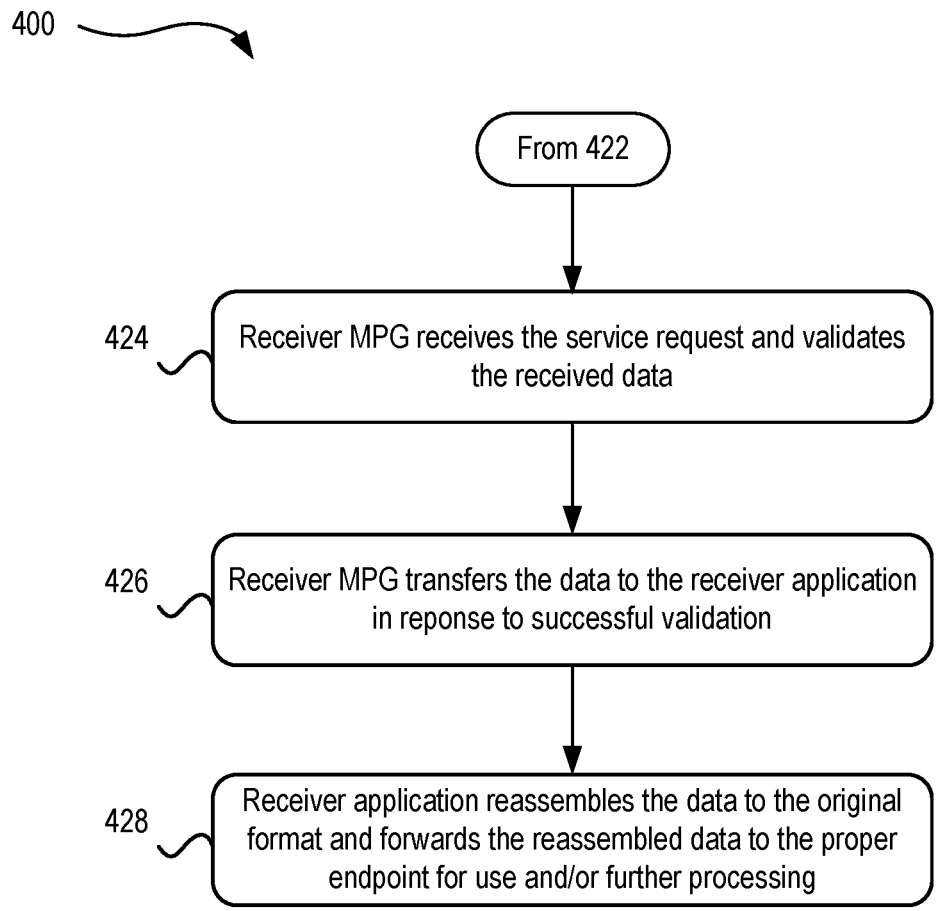

Now referring to FIG. 4, a flowchart of a method 400 is shown according to one approach. The method 400 may be performed in accordance with the present invention in any of the environments depicted in FIGS. 1-3, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a sender application deconstructs an incoming payload as XML format. Known techniques may be used. In one approach, the deconstruction is accomplished using Data Format Description Language (DFDL) or the like, which results in an XML based output, even if the input was binary.

In operation 404, in response to receiving, by the sender MPG, a request from the sender application to connect to the sender MPG, the sender application is authenticated by the sender MPG.

In operation 406, in response to successfully authenticating the sender application, the sender MPG authorizes the sender application to connect to the sender MPG. The sender MPG may communicate the authorization to the sender application.

In operation 408, the data, e.g., data payload in XML format, is received, by the sender MPG, in response to connecting to the sender application. For example, a payload of data is submitted by the sender application to the sender MPG for transmission via a service call.

In operation 410, the sender MPG returns a key generator code to the sender application. The key generator code may be predefined, may be generated by the sender MPG, etc.

In operation 412, the sender application uses the key generator code to create a key and sends both the key generator code and the key to the sender MPG.

In operation 414, the sender MPG verifies the received key. Verifying the key ensures that the sender application is not nefarious. For example, the sender application may be programmed with a same key generator as the sender MPG, and thus a key generated by the sender MPG using the same code should be identical to the key returned by the sender application. An unauthorized sending application would presumably not have the same key generator as the sender MPG.

Operations 410-412 may also and/or alternatively be used to distinguish between multiple sender applications. For example, requests may be coming in to the sender MPG from many sender application sources. An example would be many laptops having the sender application installed and trying to connect and send the data to the same sender MPG. The sender MPG may issue one of many key generator codes to use the appropriate algorithm which is used by a sender application to generate the key and then send the key generator code (along with the key) back to the sender MPG to ensure the same algorithm is used to verify the key. If the sender application is malicious and not the real application installed by the organization, then it may not be able to use the key generator code to apply the appropriate algorithm to generate the key.

One reason that the sender application returns the key generator code is to ensure the sender MPG uses the matching code to verify the key, as the sender MPG and/or sender app might use more than one key generator code, as well as in consideration of the possibility of there being many sender applications interacting with the sender MPG.

In another approach, where there is always a single connection from the sender application at any given point of time, then the key generator code need not be sent, e.g., even if there are many laptops with the sender application installed, then only one can connect and send the data before another is allowed to create a connection.

In response to successful key validation, the sender MPG selects the proper schema for validating the XML payload. Note that the sender MPG has prior knowledge of the possible formats to be received. See operation 416.

In operation 418, each field in the payload is validated against the constraints provided in the schema, e.g., using XML processing technology within the sender MPG.

In operation 420, the sender MPG makes a service request using preconfigured information (e.g., a certificate, IP address, port, service name within a Multi-Protocol Gateway Virtual Machine (VM), etc. For example, if the sender MPG is running as a VM, the preconfigured information may be encrypted and secured within the VM image to prevent access thereto and/or tampering therewith.

The endpoint of this service request is the receiver MPG exposed on the high side network. The receiver MPG receives the service request. See operation 422. However, the receiver MPG will not reply back or acknowledge in any way (even in case of an error).

In operation 424, the receiver MPG receives the service request and validates the received data, e.g., a DFDL/XML payload. In one approach, the receiver MPG is configured to validate the received data against a copy of the predefined schema definition that is available to the receiver MPG. The copy of the predefined schema definition is preferably identical to the schema definition used by the sender MPG, but could have variations that allow the receiver MPG to receive data from multiple sender MPGs while still allowing validation of the data.

In operation 426, in response to successful schema validation, the data is transferred to the receiver application by the receiver MPG.

In operation 428, the receiver application reassembles the data to the original format and forwards the reassembled data to the proper endpoint for use and/or further processing.

In some approaches, the sender MPG may be deleted for disabling sending of additional data to the receiver MPG. This unique feature is enabled by the software nature of the sender MPG, allowing quick and complete destruction of the sender MPG without having to destroy hardware, thereby ensuring that the sender MPG does not fall into the hands of an unauthorized entity who might try to reverse engineer the sender MPG for nefarious purposes. In contrast, it is difficult to completely destroy hardware in the field, rendering it vulnerable to capture.

There has thus been described a CDS approach that may take the form of a software only solution to provide a level of isolation between networks without having to have specialized hardware in the field. This solution is particularly useful for forward deployed units that have need to connect to their classified networks, without the need to have specialized hardware, which may be impractical or unavailable. This approach provides an alternative using software components.

In preferred aspects, the sender MPG fully validates data provided to it for transmission against a common schema definition, and this definition is also used on the receiver MPG to ensure the data is compliant and safe to use.

Moreover, the two paired MPGs described herein may implement a protocol which eliminates responses/replies/error reporting to any invocation on the receiver MPG, thereby reducing any insights which might be gained by attempting to probe the receiver MPG on the network.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the approaches disclosed herein.

What is claimed is:

1. A computer-implemented method, comprising:
   receiving, by a sender multi-protocol gateway (MPG) implemented in software, data from a sender application for transmission to a receiver endpoint;
   sending, by the sender MPG, a key generator code to the sender application in response to receiving the data from the sender application;
   receiving, by the sender MPG, a key generated using the key generator code from the sender application;
   verifying, by the sender MPG, the key;
   in response to successful verification of the key, validating, by the sender MPG, the data against a predefined schema definition; and
   in response to successfully validating the data, making, by the sender MPG, a service request using preconfigured information, wherein an endpoint of the service request is a receiver MPG configured to forward the validated data to a receiver application in communication with the receiver endpoint, wherein the receiver MPG is configured to not reply in any way to the sender MPG and sender application in response to receiving the service request.

2. The computer-implemented method of claim 1, wherein a computer running the sender MPG does not have an isolation diode.

3. The computer-implemented method of claim 1, wherein the receiver MPG is implemented in software, wherein the sender MPG is deployed in software on a mobile computer; and comprising deleting the sender MPG for disabling sending of additional data to the receiver MPG.

4. The computer-implemented method of claim 1, comprising, in response to receiving, by the sender MPG, a request from the sender application to connect to the sender MPG, authenticating, by the sender MPG, the sender application; and in response to authenticating the sender application, authorizing, by the sender MPG, the sender application to connect to the sender MPG, wherein the data is received, by the sender MPG, in response to connecting to the sender application.

5. The computer-implemented method of claim 1, wherein the sender application deconstructs the data to a textual format prior to sending the data to the sender MPG.

6. The computer-implemented method of claim 1, wherein the predefined schema definition defines fields in the data that are to be sent to the receiver MPG as well as constraints for the data in the fields, wherein validating the data against the predefined schema definition includes validating each field in the data against the constraints provided in the predefined schema definition, and wherein the receiver MPG is configured to reject the data in response to determining that the data does not conform to the predefined schema definition.

7. The computer-implemented method of claim 1, wherein the receiver MPG is configured to validate the data received thereby against a copy of the predefined schema definition, wherein the receiver MPG is configured to reject the data in response to determining that the data does not conform to the predefined schema definition.

8. The computer-implemented method of claim 1, comprising deleting the sender MPG for disabling sending of additional data to the receiver MPG.

9. The computer-implemented method of claim 1, wherein the sender MPG is deployed on a mobile computer.

10. The computer-implemented method of claim 1, wherein the sender MPG is deployed on a cloud-based server in communication with a remote computer running the sender application.

11. The computer-implemented method of claim 1, comprising receiving, by the receiver MPG, the service request; validating, by the receiver MPG, the data associated with the service request against the predefined schema definition; and in response to successfully validating the data, sending the data to the receiver application, wherein the receiver MPG is implemented in software, wherein the receiver MPG has an isolation diode.

12. A computer program product, the computer program product comprising:
one or more computer readable storage media, and program instructions collectively stored on the one or more computer readable storage media, the program instructions comprising:
program instructions to receive, by a sender multi-protocol gateway (MPG) implemented in software, data from a sender application for transmission to a receiver endpoint;
program instructions to send, by the sender MPG, a key generator code to the sender application in response to receiving the data from the sender application;
program instructions to receive, by the sender MPG, a key generated using the key generator code from the sender application;
program instructions to verify, by the sender MPG, the key;
program instructions to, in response to successful verification of the key, validate, by the sender MPG, the data against a predefined schema definition; and
program instructions to, in response to successfully validating the data, make a service request using preconfigured information,
wherein an endpoint of the service request is a receiver MPG configured to forward the validated data to a receiver application in communication with the receiver endpoint,
wherein the receiver MPG is configured to not reply in any way to the sender MPG and sender application in response to receiving the service request.

13. The computer program product of claim 12, comprising program instructions to authenticate, by the sender MPG, the sender application in response to receiving, by the sender MPG, a request from the sender application to connect to the sender MPG; and program instructions to authorize, by the sender MPG, the sender application to connect to the sender MPG in response to authenticating the sender application, wherein the data is received, by the sender MPG, in response to connecting to the sender application.

14. The computer program product of claim 12, wherein the sender MPG is deployed in software on a mobile computer; and comprising deleting the sender MPG for disabling sending of additional data to the receiver MPG.

15. The computer program product of claim 12, wherein the predefined schema definition defines fields in the data that are to be sent to the receiver MPG as well as constraints for the data in the fields, wherein validating the data against the predefined schema definition includes validating each field in the data against the constraints provided in the predefined schema definition, and wherein the receiver MPG is configured to reject the data in response to determining that the data does not conform to the predefined schema definition.

16. The computer program product of claim 12, wherein the receiver MPG is configured to validate the data received thereby against a copy of the predefined schema definition, wherein the receiver MPG is configured to reject the data in response to determining that the data does not conform to the predefined schema definition.

17. The computer program product of claim 12, comprising program instructions to delete the sender MPG for disabling sending of additional data to the receiver MPG.

18. A system, comprising:
a processor; and
logic integrated with the processor, executable by the processor, or integrated with and executable by the processor, the logic being configured to:
receive, by a sender multi-protocol gateway (MPG) implemented in software and running on the processor, data from a sender application for transmission to a receiver endpoint;

send, by the sender MPG, a key generator code to the sender application in response to receiving the data from the sender application;

receive, by the sender MPG, a key generated using the key generator code from the sender application;

verify, by the sender MPG, the key;

in response to successful verification of the key, validate, by the sender MPG, the data against a predefined schema definition; and in response to successfully validating the data, make, by the sender MPG, a service request using preconfigured information, wherein an endpoint of the service request is a receiver MPG configured to forward the validated data to a receiver application in communication with the receiver endpoint, wherein the receiver MPG is configured to not reply in any way to the sender MPG and sender application in response to receiving the service request.

* * * * *